United States Patent
Niver et al.

(10) Patent No.: US 7,818,447 B1
(45) Date of Patent: Oct. 19, 2010

(54) END-TO-END BROADCAST BASED FLOW CONTROL IN A SWITCH FABRIC

(75) Inventors: Brett D. Niver, Grafton, MA (US); Steven R. Chalmer, Auburndale, MA (US); Steven T. McClure, Northboro, MA (US); Stephen D. MacArthur, Northboro, MA (US); Avinash Kallat, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 1393 days.

(21) Appl. No.: 10/402,009

(22) Filed: Mar. 28, 2003

(51) Int. Cl.
*G06F 15/16* (2006.01)

(52) U.S. Cl. .................. 709/234; 709/235; 709/238; 370/230; 370/231; 370/235

(58) Field of Classification Search ............... 709/233, 709/234, 223, 224; 370/230, 231, 235
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 5,983,278 A * | 11/1999 | Chong et al. | 709/235 |
| 6,029,202 A * | 2/2000 | Frazier et al. | 709/232 |
| 6,147,969 A * | 11/2000 | Benmohamed et al. | 370/230 |
| 6,728,211 B1 * | 4/2004 | Peris et al. | 370/235 |
| 6,735,173 B1 * | 5/2004 | Lenoski et al. | 370/235 |
| 6,992,980 B2 * | 1/2006 | Brezzo et al. | 370/229 |
| 2002/0159385 A1 * | 10/2002 | Susnow et al. | 370/229 |
| 2003/0058880 A1 * | 3/2003 | Sarkinen et al. | 370/413 |
| 2003/0088680 A1 * | 5/2003 | Nachenberg et al. | 709/229 |
| 2003/0123393 A1 * | 7/2003 | Feuerstraeter et al. | 370/235 |
| 2003/0126280 A1 * | 7/2003 | Yao et al. | 709/234 |
| 2003/0156542 A1 * | 8/2003 | Connor | 370/236 |
| 2004/0004961 A1 * | 1/2004 | Lakshmanamurthy et al. | 370/364 |
| 2004/0032827 A1 * | 2/2004 | Hill et al. | 370/229 |
| 2004/0165530 A1 * | 8/2004 | Bedekar et al. | 370/235 |
| 2008/0175233 A1 * | 7/2008 | Chung et al. | 370/356 |

* cited by examiner

*Primary Examiner*—Thuong (Tina) T Nguyen
(74) *Attorney, Agent, or Firm*—Muirhead and Saturnelli, LLC

(57) ABSTRACT

Described is an end-to-end broadcast-based messaging technique used in controlling message flow in a data storage system. Each node stores flow control state information about all the nodes which is used in determining whether to send a data transmission to a receiving node. The flow control state information includes an indicator as to whether each node is receiving incoming data transmissions. If a node is not receiving incoming data transmissions, the flow control state information also includes an associated expiration time. Data transmissions are resumed to a receiving node based on the earlier of a sending node determining that the expiration time has lapsed, or receiving a control message from the receiving node explicitly turning on data transmissions. Each node maintains and updates its local copy of the flow control state information in accordance with control messages sent by each node to turn on and off data transmissions. Each node sends out control messages in accordance with predetermined threshold levels taking into account hardware and/or software resources for message buffering.

22 Claims, 10 Drawing Sheets

| | Node 0 | Node 1 | ... | Node N |
|---|---|---|---|---|
| XOFF State | 1 | 0 | | 0 |
| Expiration Time | time exp= current time + time delta | | | |

FIGURE 5

END-TO-END BROADCAST BASED FLOW CONTROL IN A SWITCH FABRIC

BACKGROUND

1. Technical Field

This application generally relates to a computer system, and more particularly to flow control within a switching fabric.

2. Description of Related Art

Computer systems may include different resources used by one or more host processors.

Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Within a system, such as the Symmetrix™ data storage system, messages may be communicated between different components using a switch fabric. The switch fabric may include one or more switches arranged to permit transmissions of messages between different components, such as processors or directors, included in a single Symmetrix system. Messages may also be referred to as frames and may include a header portion and a payload, such as data. Various techniques may be used in connection with buffering messages for software and/or hardware within the system to ensure that no hardware and/or software buffer overrun occurs. The switch fabric may employ link-level flow control of messages in which, for example, a switch within the switch fabric controls the flow of incoming messages between itself and an endpoint. However, such techniques may not be efficient in limiting the amount of overhead incurred in order to avoid buffer overruns. Additionally, the link-level flow control regulates message flow only at the link level. It may be desirable and prove more efficient to take into account a more global view of message flow rather than at the link level.

SUMMARY OF THE INVENTION

In accordance with one aspect of the invention is a method for controlling message flow between endpoints in a system. For each endpoint, flow control state information indicating whether each endpoint is in a receiving incoming message state is stored. A first endpoint determines, when a received message is processed from a receive message buffer, whether a first threshold is maintained in available buffer space and whether a second threshold is maintained in the receive message buffer. A first endpoint sends a message to other endpoints that the first endpoint is not in a receiving incoming message state when the first endpoint determines that at least one of the first threshold and the second threshold is not maintained.

In accordance with another aspect of the invention is a computer program product that controls message flow between endpoints in a system comprising: machine executable code that stores, for each endpoint, flow control state information indicating whether each endpoint is in a receiving incoming message state; machine executable code that determines, by a first endpoint when a received message is processed from a receive message buffer, whether a first threshold is maintained in available buffer space and whether a second threshold is maintained in the receive message buffer; and machine executable code that sends, by a first endpoint, a message to other endpoints that said first endpoint is not in a receiving incoming message state when said first endpoint determines that at least one of said first threshold and said second threshold is not maintained.

BRIEF DESCRIPTION OF THE DRAWINGS

Features and advantages of the present invention will become more apparent from the following detailed description of exemplary embodiments thereof taken in conjunction with the accompanying drawings in which:

FIG. 5 is an example of an embodiment of a flow control state table;

DETAILED DESCRIPTION OF EMBODIMENT(S)

Figure 1:
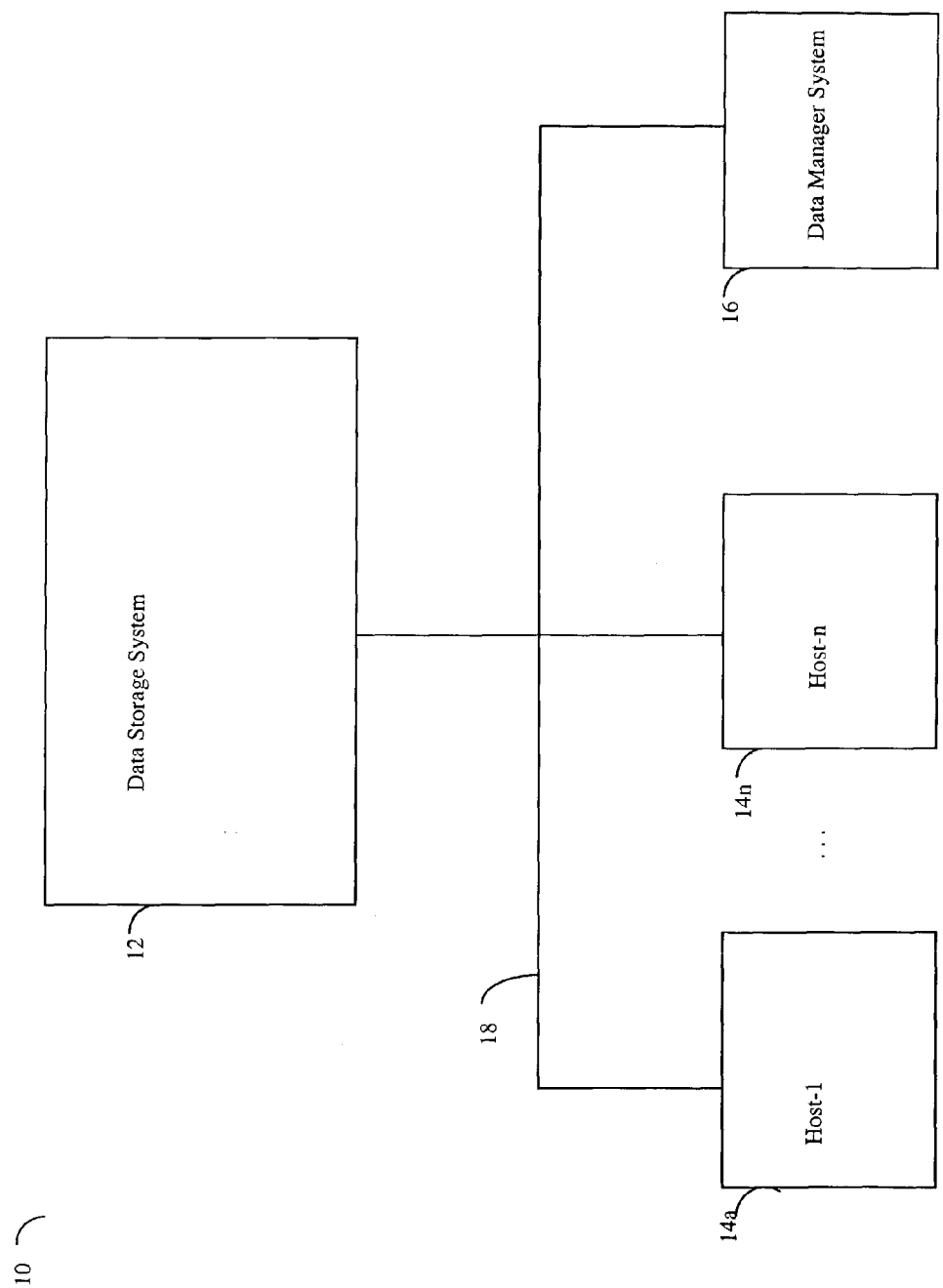
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n, and a data manager system 16 through communication medium 18. In this embodiment of the computer system 10, the N hosts 14a-14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10.

Each of the host systems 14a-14n, the data manager system 16, and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n and the data manager system 16, as well as those components that may be included in the data storage system 12 are described herein in more detail, and may vary with each particular embodiment. Each of the host computers 14a-14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a-14n may issue a data request to the data storage system 12 to perform a data operation.

Figure 2:
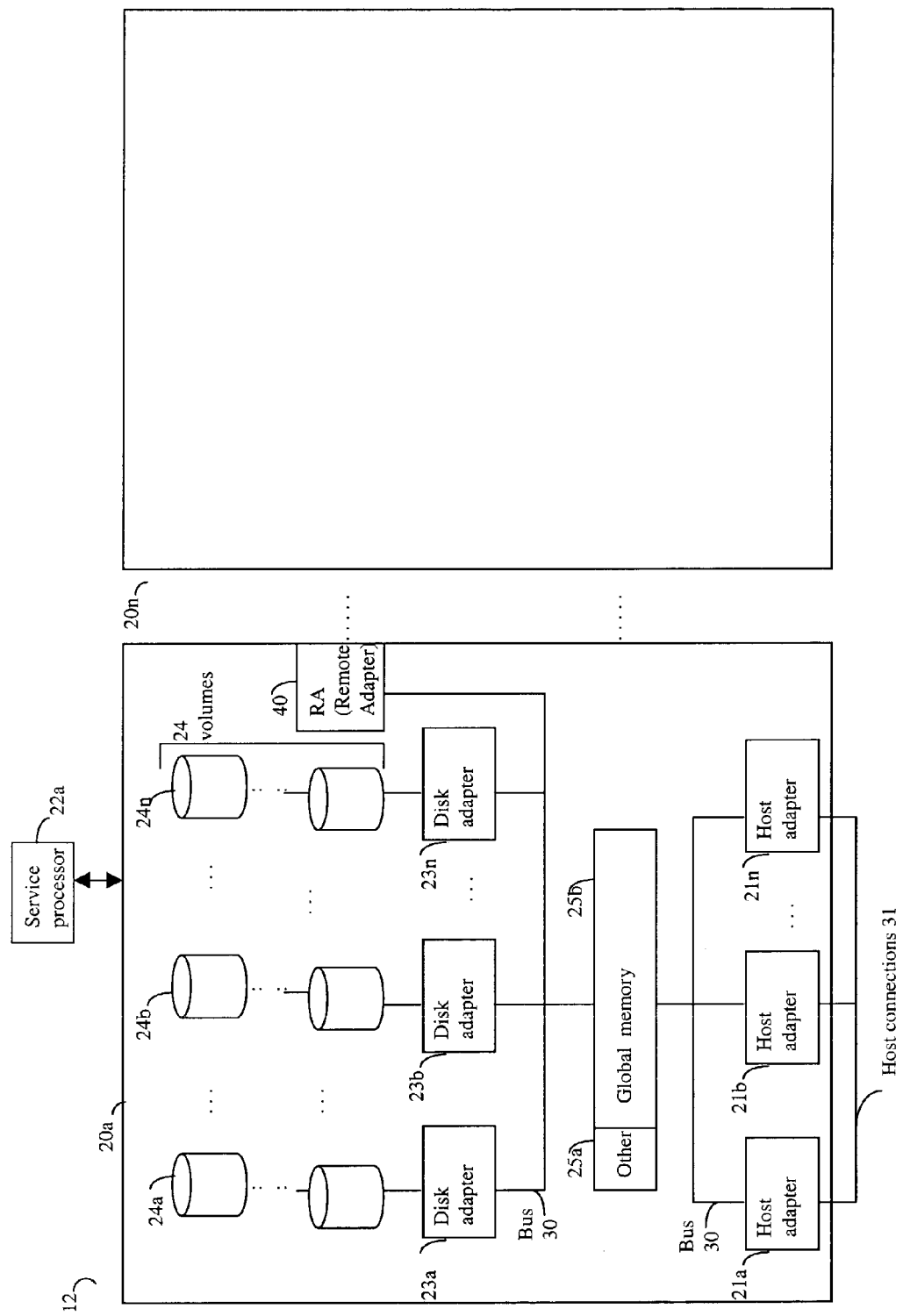
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a-20n as manufactured by EMC Corporation of Hopkinton, Mass. In this particular example, each of the Symmetrix™ storage systems 20a-20n may be inter-connected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a-20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a-23n are connected, for example, by a bus 30 to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a-14n. This performance data may be gathered and stored, for example, in the global memory and/or other storage area.

The system 20a may also include one or more host adapters ("HAs") or directors 21a-21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
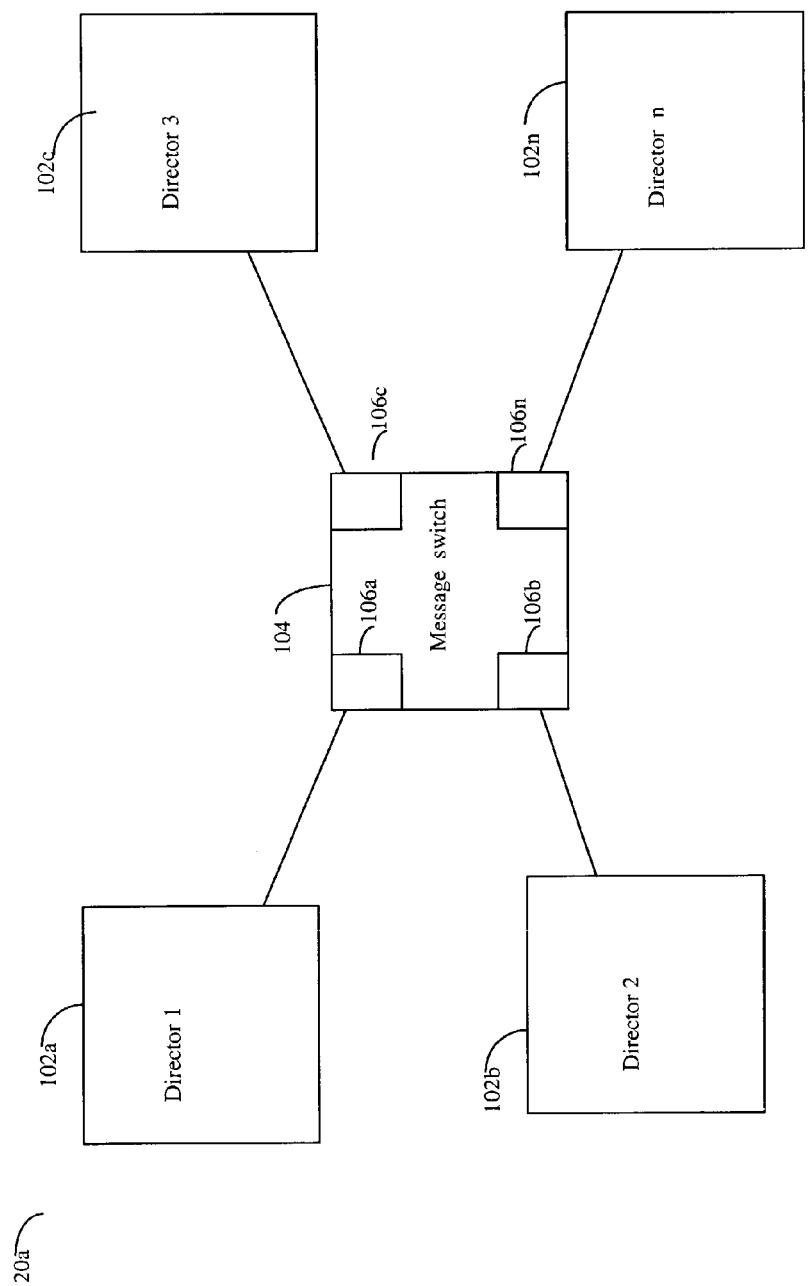
FIG. 3 is a more detailed example of one embodiment of a data storage system.

Referring now to FIG. 3, shown is a detailed example of an embodiment of components of that may be included in the data storage system 20a. It should be noted that an embodiment may include other components than as shown in FIG. 3. The data storage system 20a of FIG. 3 presents a simplistic view including only particular components described previously in connection with FIG. 2 for purposes of illustration and example in connection with techniques that are described in the following paragraphs. It should also be noted that the components of FIG. 3 as described in connection with system 20a may also be included in each of systems 20b-20n.

This embodiment of the system 20a includes directors 102a through 102n and a message switch 104. The message switch 104 may be included within the message switch fabric. The message switch may be used in routing messages between different directors or processors 102a through 102n. Included in the message switch 104 of this embodiment are a plurality of hardware message buffers 106a-106n. The message switch 104 controls the flow of incoming messages that may be stored in each of the buffers 106a through 106n from a respective director 102a through 102n connected to the message switch. Each of the directors 102a through 102n may be a processor or a printed circuit board that includes a processor and other hardware components. Each of the directors 102a through 102n may be referred to as nodes or endpoints within the system 20a. The message switch provides link-level flow control information by providing for flow of control of messages being transmitted, for example, between the message switch and a single director.

What will now be described are techniques that may be utilized in connection with controlling the flow of communication from one end to another, such as between two directors or nodes, and may be characterized as end-to-end flow control. The techniques described herein may be used in other embodiments for end-to-end flow control, for example, in which the nodes are other endpoints besides the directors as described herein.

Figure 4:
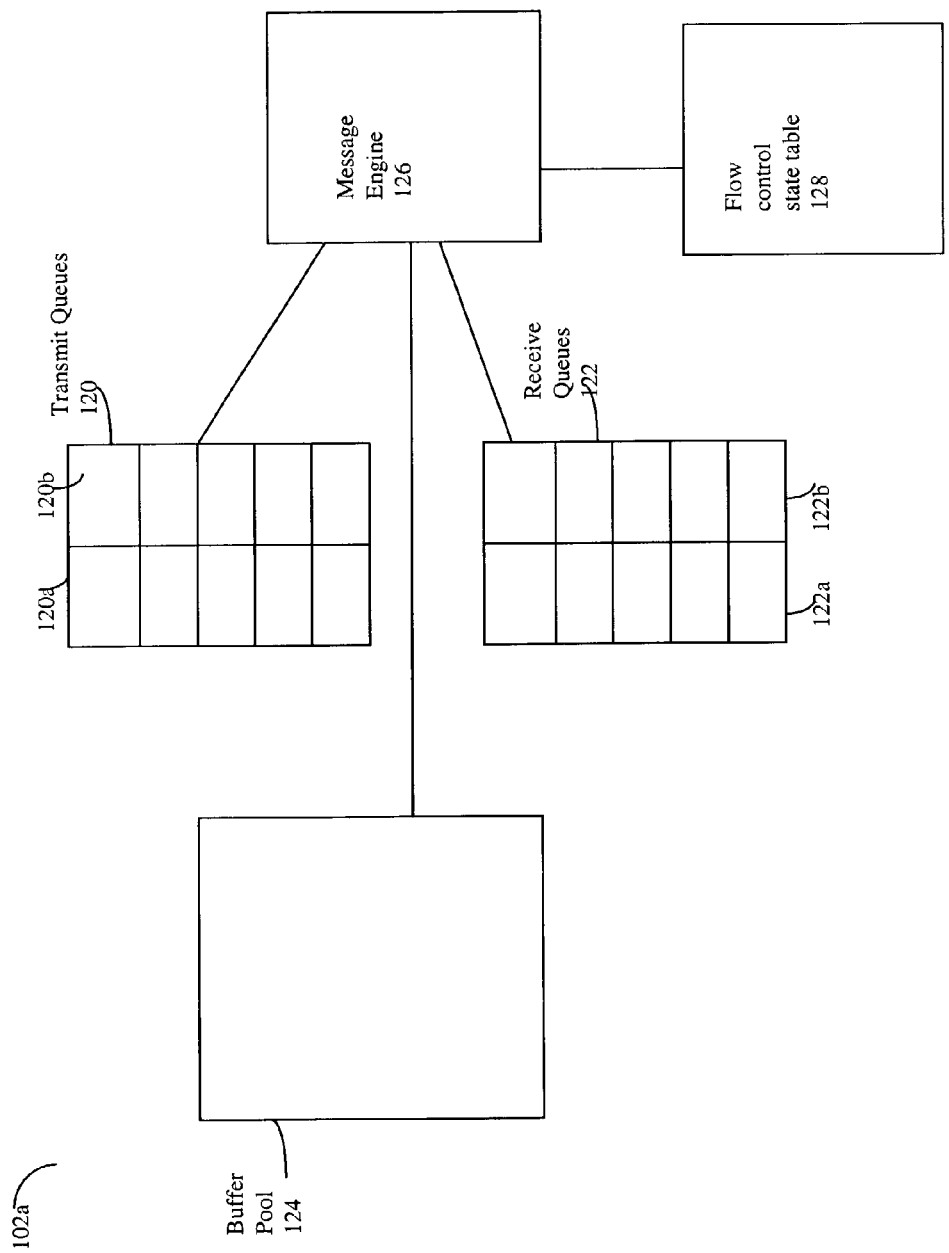
FIG. 4 is an example of an embodiment of components that may be included in a director.

Referring now to FIG. 4, shown is an example of an embodiment of hardware and/or software components that may be included within a director, such as director 102a. It should be noted that although details are shown for a single director 102a, each of the other directors 102b through 102n may similarly include components as described in connection with FIG. 4. Included in FIG. 4 is a buffer pool 124, transmit queues 120, receive queues 122, a message engine 126 and a flow control state table 128.

In this embodiment, there are two types of receive queues 122—a data receive queue 122a and a control receive queue 122b—used for buffering received transmissions. Additionally, in this embodiment are two types of transmit queues 120—a data transmit queue 120a and a control transmit queue 120b—used for buffering outgoing transmissions. A transmission or message may be a control transmission or a data transmission. Control transmissions or messages may be characterized as commands used in connection with controlling the flow of data messages between nodes. An embodiment may alternatively have a single transmit and/or receive queue that collectively holds both control and data messages rather than a separate queue for control messages and data messages.

An incoming transmission of the director or node 102a is placed in the appropriate one of the receive queues 122. The incoming transmission may then be retrieved from the receive queue 122 by the message engine which extracts appropriate data portions for processing and places the data within a buffer obtained from the buffer pool 124. An outgoing message is placed in the appropriate one of the transmit queues 120. The message engine 126 extracts the data portion from the transmit queues 120 and forwards it to the message switch. It should be noted that the transmit queues 120 and the receive queues 122 may be used as temporary holding areas for transmissions respectively sent from, and to, a node or director 102a. The flow control state table 128 includes information used by the message engine 126 in connection with transmitting data messages from the transmit queue 120. As will be described in following paragraphs, the flow control state table 128 includes information as to which other nodes in the system are currently receiving data messages or transmissions. Generally, the flow control state table describes flow control states of other nodes within the system 20a.

It should be noted that in this embodiment, the transmit queues 120 and the receive queues 122 are implemented in hardware, such as a portion of SDRAM (synchronous dynamic random access memory), and the buffer pool 124 is a portion of memory from which the data is allocated and used in connection with extracting the appropriate data portions of an incoming transmission for use within a particular node. Message engine 126 is implemented in hardware and manages the message queues. The flow control state table may be implemented using a portion of memory such as a RAM (random access memory). Other embodiments may implement these and other components in varying combination of hardware and/or software.

Using techniques described in following paragraphs, the amount of hardware and software resources is monitored in connection with controlling the flow of data messages received by, and transmitted to, a particular node in the system since the receive data queue and the buffer pool space are limited resources. Accordingly, the receive data queue 122a and the buffer pool 124 may be monitored in connection with threshold values to implement end-to-end flow control ensuring that no hardware or software buffer overruns occur. As described in following paragraphs, every potential sending node connected to a switch fabric includes a flow control state table that indicates the state of flow control for every other potential receiving node. When any sending node wants to send a data message to any particular receiver, the flow control state table 128 included within that particular sending node is checked to see whether a particular receiving node is accepting incoming data transmissions.

Figure 5:
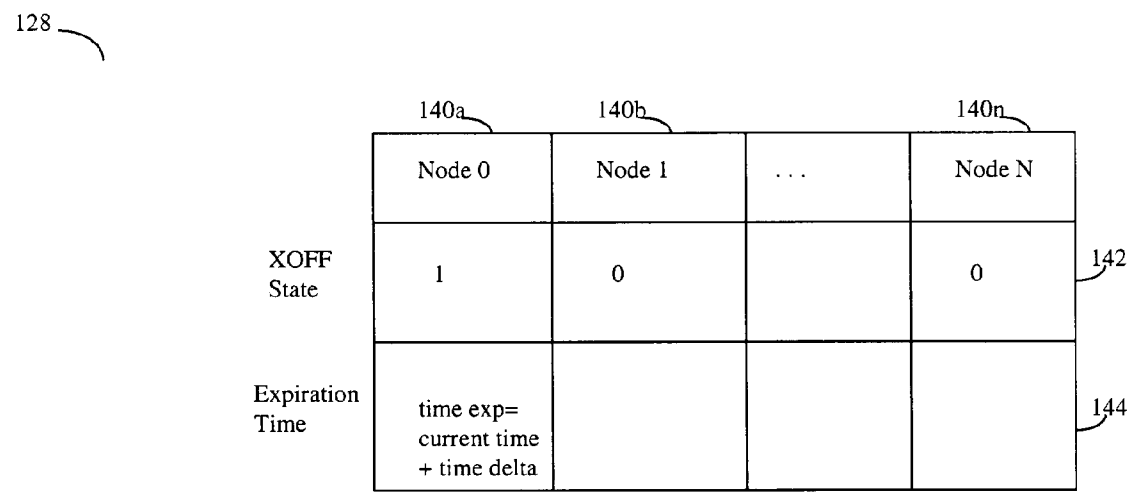

Referring now to FIG. 5, shown is an example of an embodiment of the flow control state table 128. In this embodiment, the flow control state table 128 includes a column for each of the possible destination nodes within the system 20a. Each column includes two entries of information regarding the XOFF state and the associated XOFF status expiration time. In table 128, row 142 includes the XOFF state information for each destination node. The XOFF state information is a value indicating whether or not a sending node is allowed to transmit data messages to a destination node associated with this particular column. In one embodiment, the XOFF state information is a boolean value of 1 when data transmissions are not allowed to the destination node. The XOFF state information field has a value of 0 when data transmissions are allowed to be sent to the destination node. When the XOFF state information field has a value of 0, this may be referred to as the "XON" state. Row 144 of table 128 includes expiration time information. An expiration time entry is only utilized when the XOFF state is indicated as 1 when data transmissions are not allowed to be sent to the destination node associated with this particular column. The expiration time entry indicates a default or maximum time value as to when the XOFF state expires. After the expiration time is reached, the XOFF state is changed to the XON state automatically to allow data transmissions to a destination node. If the XOFF state is 0 (XON), data transmissions are allowed to the destination node and the expiration time does not include a utilized data value.

It should be noted that data included in the table 128 at a point in time may be viewed as a snapshot of state information about flow control as maintained locally by one of the nodes in the system. At any later point in time, the state information included in the snapshot may change.

As an example shown in the illustration of FIG. 5, column 140a indicates data associated with node 0. If the data in column 140a is associated with director 102a, the table 128 indicates at a particular time that data transmissions may not be sent to node 0 until the expiration time as indicated in column 140a has been reached. When the expiration time as indicated in column 140a has been reached, the XOFF state of node 0 in column 140a is modified to a 0 entry and the expiration time contains data value which is not utilized. An embodiment may, for example, initialize the expiration time to 0 or some other value indicating that this data field is not utilized. A sending node uses its local copy of the table 128 in determining whether the sending node may send a message to a particular destination node. The expiration time may take any one of a variety of different forms. In one embodiment, the expiration time represents a time value formed by adding a time delta value to the current time, for example, as kept locally by a processor. The time delta value is an absolute time value that may be specified as a message parameter and used in forming the expiration time value. This is described in more detail in following paragraphs.

It should be noted that table 128 of FIG. 5 is an example representation of the flow control state information. Other embodiments may use a different data structure or represent the state information in a different format.

Figure 6:
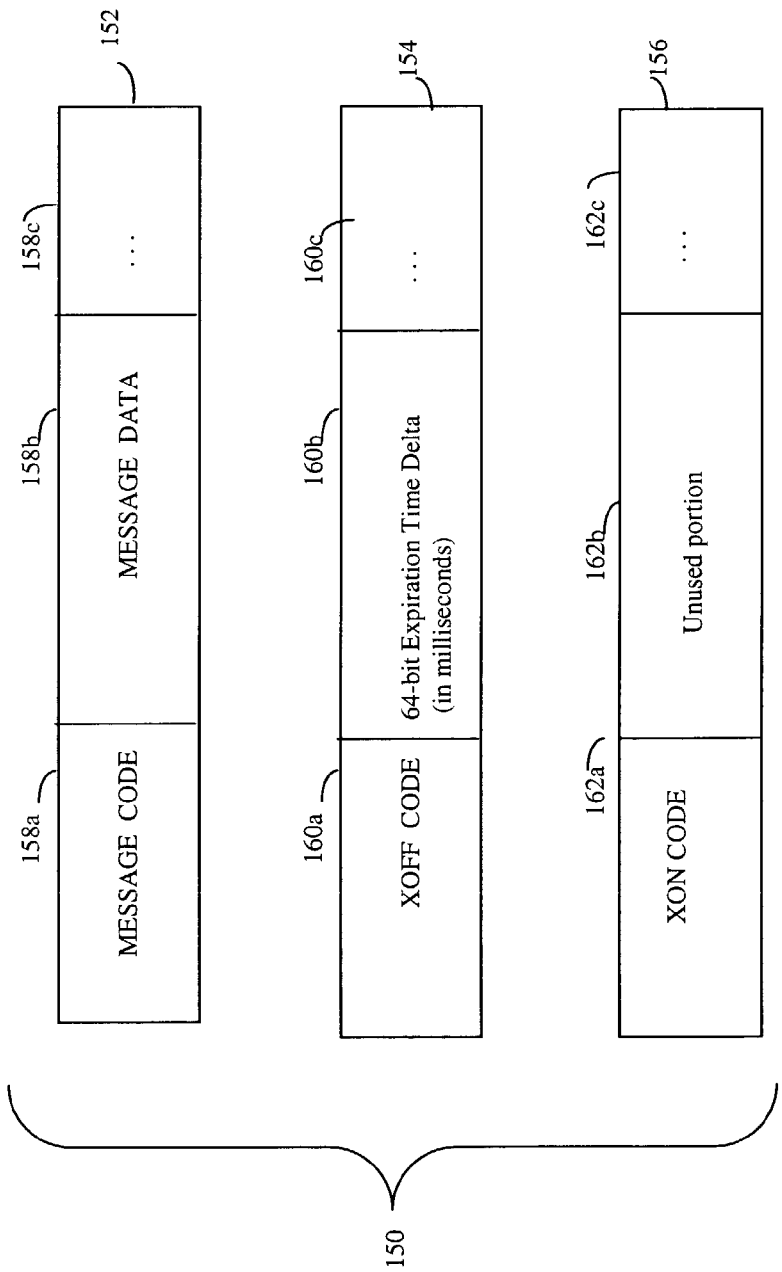
FIG. 6 is an example of message or frame formats that may be transmitted between nodes in the system of FIG. 3.

Referring now to FIG. 6, shown is an example of message formats 150 that may be utilized in the system 20a in connection with implementing the XON and XOFF messages. The XON and XOFF messages are examples of control messages that may be sent between nodes, which are processors in this embodiment. The XOFF and XON messages may processed using the transmit control queue of a sending node and a transmit receive queue of a receiving or destination node.

The message format 152 represents a generic message format that may be used in connection with transmitting the XOFF and XON messages in an embodiment of the network described herein. The generic format 152 includes a message code portion 158a, a message data section 158b, and other data may be optionally included in another section 158c. The format 154 is a representation of the XOFF message in accordance with the generic format 152. The XOFF message may include a particular XOFF code value in portion 160a and a 64 bit expiration time delta in milliseconds in portion 160b. Other data may optionally be included in portion 160c that may vary in accordance with each embodiment. The particular XOFF code 160a may be a particular operation code that specifies the XOFF type of message operation. Similarly, a message 156 may be used in connection with sending the XON message that includes an XON code specified in the portion 162a. It should be noted that portion 162b is unused in this example with the XON code and may be initialized, for example, to a zero value.

The XOFF message format 154 includes a delta time value in the section 160b. The delta time value is an absolute time value in this embodiment. As described elsewhere herein in connection with the flow control state table, the time delta value is added to the local current time when an XOFF message is received by a node. The value of the time delta 160b plus the local current time indicates an expiration time that may be stored in the table 120a previously described herein. It should be noted that the particular sizes and units of the various fields described in element 150 of FIG. 6 may vary in accordance with each embodiment and the particular standards and messaging techniques included in an embodiment.

It should be noted that the generic format 152 may be used in connection with both control or command transmissions and data transmissions.

In connection with XON and XOFF messages described herein, data transmission flow control between nodes, or directors in this embodiment, may be controlled.

Figure 7:
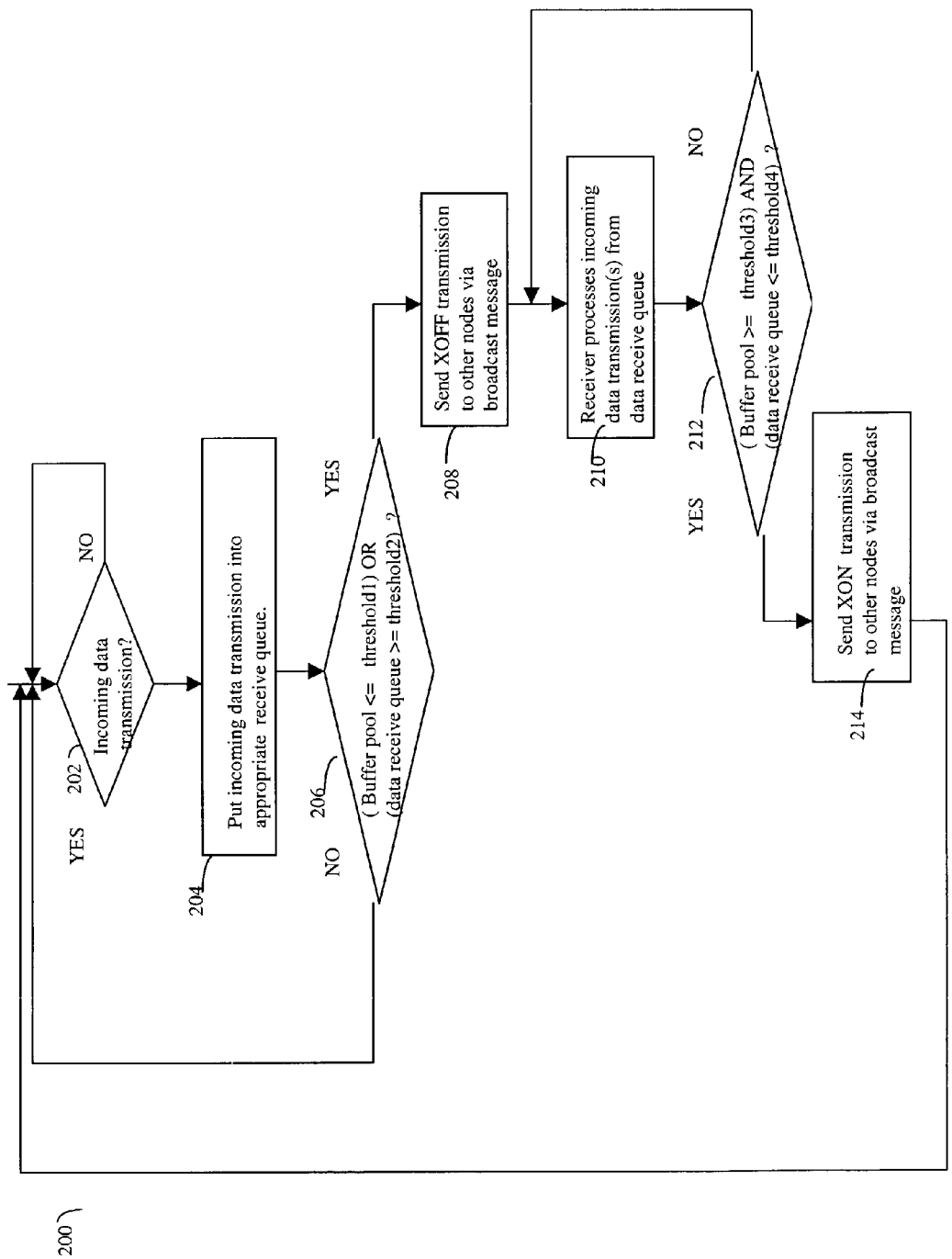
FIG. 7 is a flowchart of method steps of one embodiment for processing an incoming data message on a node.

Referring now to FIG. 7, shown is a flowchart of steps of one embodiment that may be performed on a node for processing incoming data transmissions. A node monitors for the arrival of incoming data transmission. When an incoming data transmission has been received at step 202, control proceeds to step 204 where the incoming data transmission is placed in the appropriate data receive queue. At step 206, a determination is made as to whether the size of the current buffer pool is less than or equal to a particular threshold 1, OR whether the size of the data receive queue is greater than or equal to a threshold 2. At step 206, it is being determined whether too many hardware or software resources have been utilized. Threshold 1 and threshold 2 may be selected such that hardware and software buffer overruns do not occur taking into account factors such as possible number of sending and receiving nodes, messaging traffic and the like. In one embodiment, threshold 1 is selected as ⅓ of the original size of the buffer pool, and threshold 2 may be selected as ½ of the depth of the data receive queue size. At step 206, if a determination is made that the hardware and software resources available are adequate, control proceeds back to step 202 to wait and process additional incoming data transmissions. Otherwise, if step 206 determines that the hardware or software resources are not at adequate levels, control proceeds to step 208 where an XOFF transmission is sent to all of the other nodes in the network using a broadcast message.

Control proceeds to step 210 where the receiver processes incoming data transmissions from the data receive message queue. Control proceeds to step 212 where a determination is made as to whether there are adequate levels of hardware and/or software resources available. If not, control proceeds back up to step 210 where additional data transmissions are processed from the data receive queue. By processing the messages on the data receive queue and not accepting any additional incoming data messages, the receive data queue increases in size up to an acceptable threshold level specified as threshold 4 in this example. Similarly, as a receiver processes incoming transmissions from the data receive queue, memory is returned to the buffer pool increasing the size buffer pool to an acceptable level as indicated by threshold 3 in this example. In one embodiment, threshold 3 may be implemented as ⅔ of the original size of the buffer pool. Threshold 4 may be implemented as ¼ of the depth of the data receive queue indicating that at least ¾ of the data receive queue must be available. Once the acceptable threshold levels are reached and determined at step 212, control proceeds to step 214 where an XON transmission is sent to all other nodes via a broadcast message indicating that data transmissions may once again be sent to this particular node.

When a node receives the XOFF or the XON transmission from a particular sending node, the receiving node accordingly updates its own copy of the state table 128. The node sending the XOFF or XON transmission may also send a control message to itself using the broadcast message.

Figure 8:
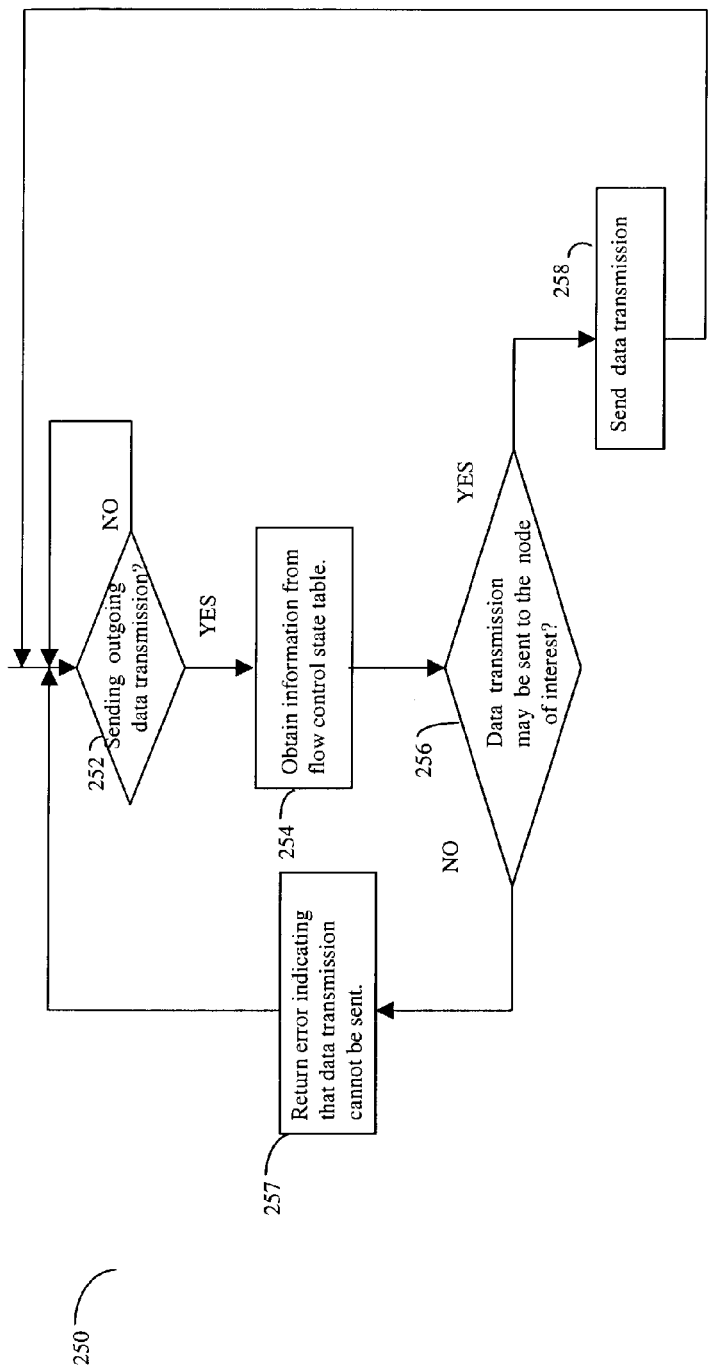
FIG. 8 is a flowchart of method steps of one embodiment for transmitting a data message from a node.

Referring now to FIG. 8, shown is a flowchart 250 of steps of one embodiment that may be executed by a node in connection with sending a data transmission. At step 252, testing is performed until a data transmission is detected in the data transmit queue. Once a transmission is within the data transmit queue, control proceeds to step 254 where information is obtained from the flow control state table. A determination is made at step 256 as to whether the node of interest is accepting data transmissions in accordance with information stored in the flow control state table of the sending node. If data transmissions may not be sent to the node of interest, control proceeds to step 257 where an error message is returned indicating that the current transmission cannot be sent to the particular node of interest. Control then proceeds to step 252 to wait for, and then process, the next outgoing data transmission. At step 256, if a determination is made that data transmissions may be sent to the node of interest, control proceeds to step 258 where the data transmission is sent. Control then proceeds back up to the test step 252 where the data transmit queue is monitored for the next data message to be sent.

Generally, the techniques described herein utilize two particular control messages or frames for transmissions being disallowed and transmissions allowed. Every time a receiving node processes a frame or message from the incoming or receiving data queue, both the hardware and software resources are checked. If either the hardware or software resources are utilized beyond predefined thresholds, the receiver broadcasts a transmission to disallow other nodes from sending additional data messages as indicated by the XOFF message. Included with the control transmission disallowed frame or message is the expected delta time as to when normal traffic may be resumed such that data messages may once again be sent to the indicated node sending the XOFF message. When the earlier of an expiration time value is reached, or an XON message is received by a sending node, the state information in the sending node is updated to indicate that data transmissions to a destination node may be resumed.

Figure 9:
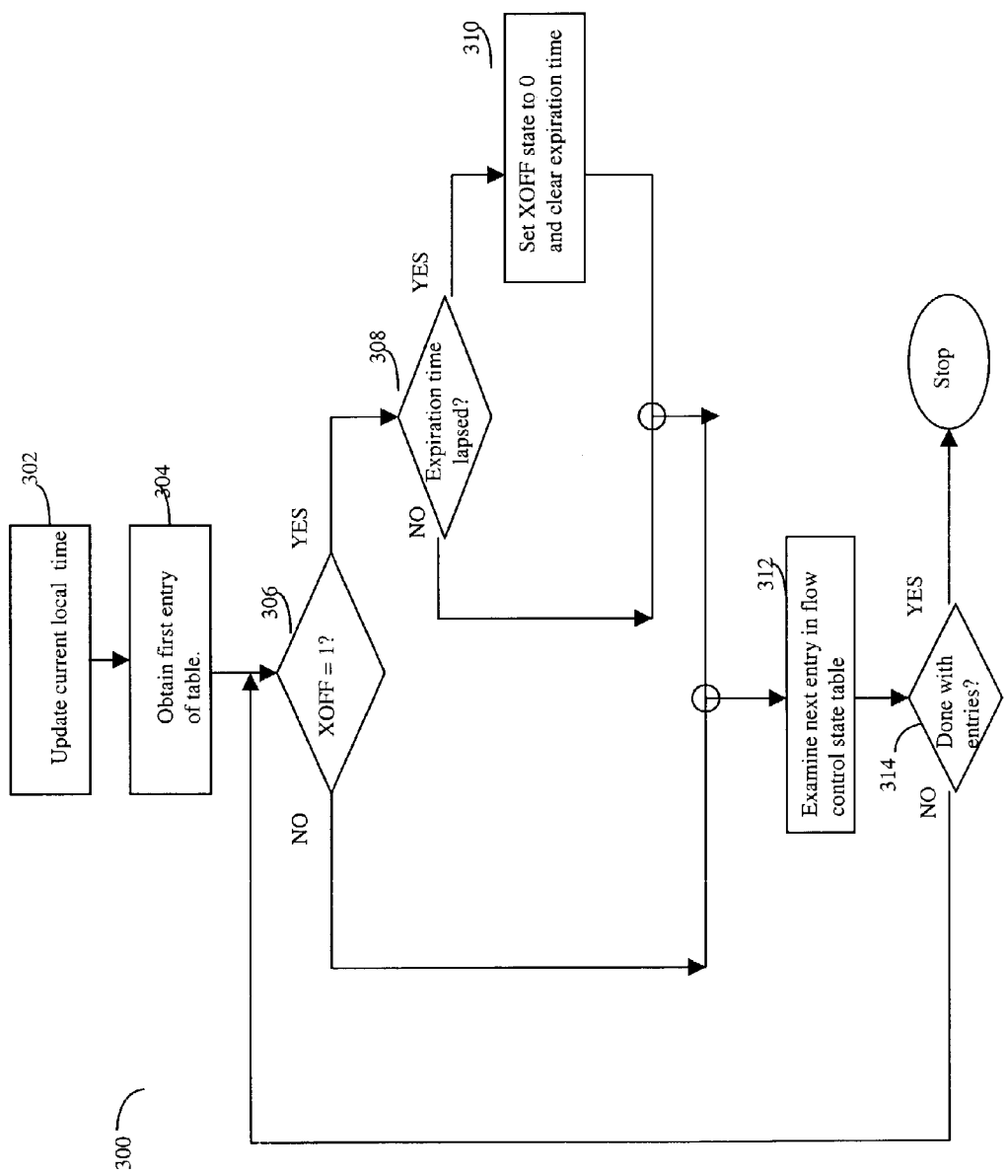
FIG. 9 is a flowchart of method steps of one embodiment for updating the flow control state table and determining when expiration times have lapsed.

Referring now to FIG. 9, shown is a flowchart 300 of steps of one embodiment for updating the flow control state table expiration times. The steps of flowchart 300 may be executed by a node at predetermined time intervals examining entries in the flow control state table to update XOFF states in accordance with expiration times that have been reached. At step 302, the local current time is updated. At step 304, the first entry of the flow control state table is obtained. At step 306, a determination is made as to whether XOFF is a value of 1 for the current entry. If not, control proceeds to step 312 where the next entry in the flow control state table is examined. Otherwise, if XOFF is 1 for the current entry at step 306, control proceeds to step 308 where a determination is made as to whether the current entry's expiration time has lapsed. This may be determined by comparing the expiration time of the current entry to the current time. If the expiration time has lapsed, control proceeds to step 310 where the XOFF state is set to 0 and the expiration time is cleared for the current entry. Otherwise, at step 308 if the expiration time has not lapsed, control proceeds to step 312 where the next entry in the flow control state table is examined. Subsequent to processing the current entry, the next entry in the flow control state table is examined at step 312 and a determination is made at step 314 as to whether all of the entries in flow control state table have been processed. If so, processing stops. Otherwise, control proceeds to step 306 where the corresponding row for the current entry value is examined.

The processing of flowchart 300 may be used with other techniques herein to provide for broadcast-based end-to-end flow control that has an automatic expiration of the data message flow off, or XOFF, state. It should be noted that the broadcast-based flow control technique described herein is enabled or triggered when the system load reaches a predefined point as determined in accordance with the thresholds described herein. Additionally, once thresholds are triggered on a particular receiving node, the foregoing techniques allow for quick recovery on the receiver's side by turning off incoming messages until additional predetermined threshold values have been reached indicating that the resource levels at the receiving node are once again at acceptable levels to handle incoming data messages without the threat of having buffer hardware and/or software buffer overrun for messaging.

It should be noted that in connection with the flowchart 300, an embodiment may compare the local current time to the expiration time of each entry in the flow control state table at one second intervals. Other embodiments may have different predetermined time intervals at which flow control state table is updated to implement the automatic expiration feature described herein.

The foregoing threshold values may set using any one or more of a variety of techniques. An embodiment may specify initial threshold values that may be modified at a later point in time using, for example, configuration file values, user defined interfaces, such as APIs (Application programming interfaces), system routines, and the like. Similarly, the sizes of the foregoing buffer pools, transmit queues and receive queues may be set in any one or more different ways.

An embodiment may select sizes for the buffer pools, transmit data and control queues, receive data and control queues, and thresholds in accordance with the traffic and/or resources in the particular embodiment. For example, one embodiment has a buffer pool size of 12 Kbytes and a receive queue size of 4 Kbytes such that the buffer pool size is approximately 3 times the size of the data receive hardware queue. In the embodiment, threshold 1 is the size of the data receive queue and threshold 3 is approximately twice the size of threshold 1. Additionally, the data receive queue is at least 64 times the size of the data transmit queue due to the fact that there are 64 possible nodes or directors that may be transmitting messages. This may be generalized, for example, such that the size of the data receive queue is at least an integer multiple of the maximum number of nodes or endpoints to account for the messaging traffic as a function of the number of nodes.

It should be noted that in one embodiment, the sizes and relationships described herein in connection with the data transmit queue also apply to the control transmit queue such that the size of the data transmit queue and the control transmit queue are the same. The same holds true in this embodiment for the data receive queue and the control receive queue size. Alternatively, an embodiment may use the relationships and sizes described herein in connection with determining only the size of the data queue(s) included in an embodiment with the additional consideration that the size of each receive queue (data and control) has a minimum size that depends on the number of potential senders or nodes in the system and the sizes of the data transmit queues. This may be represented as:

minimum size of data receive queue=sum of the sizes of the data transmit queues on each potential sender and minimum size of control receive queue=sum of the sizes of the control transmit queues on each potential sender.

For example, in the foregoing example with 64 possible directors, the minimum size of the data receive queue is represented by the mathematical product of 64*size of the data transmit queue, if the data transmit queue sizes are identical on each director.

An embodiment may select the various thresholds used in step 206 and step 212 to limit the amount of transitioning and additional messaging traffic between the XOFF and XON state of a node. This may be tuned in accordance with the messaging traffic in a particular embodiment.

An embodiment may select various values used as the time delta included in the XOFF message as used in determining the expiration time periods. The particular amount of the time delta may depend on the size of the queues and other system parameters selected including those described elsewhere herein. The delta time should be selected taking into account how long it may take a node to catch up with processing messages in its data receive queue. In one embodiment, the time delta is one of two values. A first value is selected when there is a configuration change, such as in connection with an optimizer reconfiguration, and otherwise, a second value is selected. The second value may be 1 second and the first value may be 10 times the first value. The second value of 1 second in this example may be selected as a value which is smaller than the minimum time out value for messages.

As described herein, the buffer pool may be used as a pool of free buffer space for the transmit queue and/or the receive queue. The extent to which this space is used may affect the selection and tuning of threshold values described herein.

In connection with messages transmitted in the foregoing, it should be noted that other messages may be sent in response to receiving a message, such as an acknowledgement message, in accordance with the messaging protocol utilized. An acknowledgement message may be sent, for example, in response to a node receiving a broadcast message.

The foregoing embodiment described herein, such as in connection with FIG. 3, uses the same communication connection to transmit control messages and data messages. An embodiment may also use separate connections for transmitting each of control messages and data messages. Accordingly, this factor may be taken into account when determining bandwidth for processing messages and may affect sizes, thresholds, and the like described herein in each particular embodiment.

One embodiment of the foregoing may use the hardware link-level flow control, for example, as may be included in the message switch. The link-level flow control and a combination of additional hardware and/or software may be used to implement the foregoing techniques providing end-to-end flow control.

It should be noted that the foregoing components described herein and the associated functionality may be performed in hardware and/or software. In one embodiment, any of the foregoing components implemented in hardware may be on a primary processor board or implemented as an application specific integrated circuit (ASIC). The hardware queues may be implemented, for example, using a portion and type of RAM. What will now be described is one particular embodiment in which a portion of the foregoing is implemented in hardware and software. Hardware may be used to manage the XOFF state information portion (row 142) of the flow control state table 128. Software may be used to manage the expiration times in row 144 of the flow control state table 128. Hardware may be used to generate and send all flow control frames or messages, including the XOFF and XON messages described herein. At a receiving node, hardware may receive the incoming data and control messages and make appropriate XOFF settings/updates and then forward the incoming messages to software, for example, to perform expiration date update to the flow control state information. The XOFF state information as maintained in row 142 of table 128 described herein may be stored in a register having a number of bits equal to the number of destination nodes. In one example, the maximum number of directors possible is 64, so the XOFF state information may be maintained in a 64 bit hardware register (XOFF_STATE) with one bit of the register corresponding to one entry in the row 142 associated with each node. The XOFF_STATE register may be maintained by hardware and readable by the software as needed for performing other processing steps described herein.

In addition to the XOFF_STATE register, the embodiment may also include an XOFF_CONTROL register which is a 32-bit control register having the following format:

| bit 31 | bit 30 | bits 29-0 |
|---|---|---|
| 1 - XOFF, 0 - XON | 1 - External, 0 Internal | 30-bit time delta in millisecond or NID (node identifier of 6-bits) | and the following truth table for the control bits

| bit 31 | bit 30 | result |
|---|---|---|
| 1 | 1 | generate XOFF with time delta |
| 1 | 0 | set XOFF for NID |
| 0 | 1 | generate XON |
| 0 | 0 | clear XOFF for NID |

Various values described herein may also be stored in registers such as threshold 2 may be stored in the following 32-bit register XOFF_THRESHOLD:

| bits 31-20 | bits 19-0 |
|---|---|
| reserved | depth in data receive queue at/above which to send XOFF | and threshold 4 may be stored in the following 32-bit register XON THRESHOLD:

| bits 31-20 | bits 19-0 |
|---|---|
| reserved | depth in data receive queue at/below which to send XON |

The time delta value included in the XOFF message may be represented as a value in milliseconds stored in the 32-bit XOFF_EXPIRATION register:

| bits 31-0 |
|---|
| Expiration value in milliseconds to send with HW generated XOFF |

An embodiment may report error messages in connection with, for example, failed data message delivery. When an embodiment detects that a data message in the data transmit queue is destined for a node having the XOFF state, the sending node may accordingly generate an error message with additional information to indicate that failed data message transmission is due to the destination node having flow control off.

In connection with the foregoing description, an embodiment may implement any one or more of a variety of different policies in connection with processing messages from the data and control queues. In one embodiment, a round-robin type of policy may be implemented such that, over time, the processing of messages from both queues approximates a Gaussian distribution.

Figure 10:
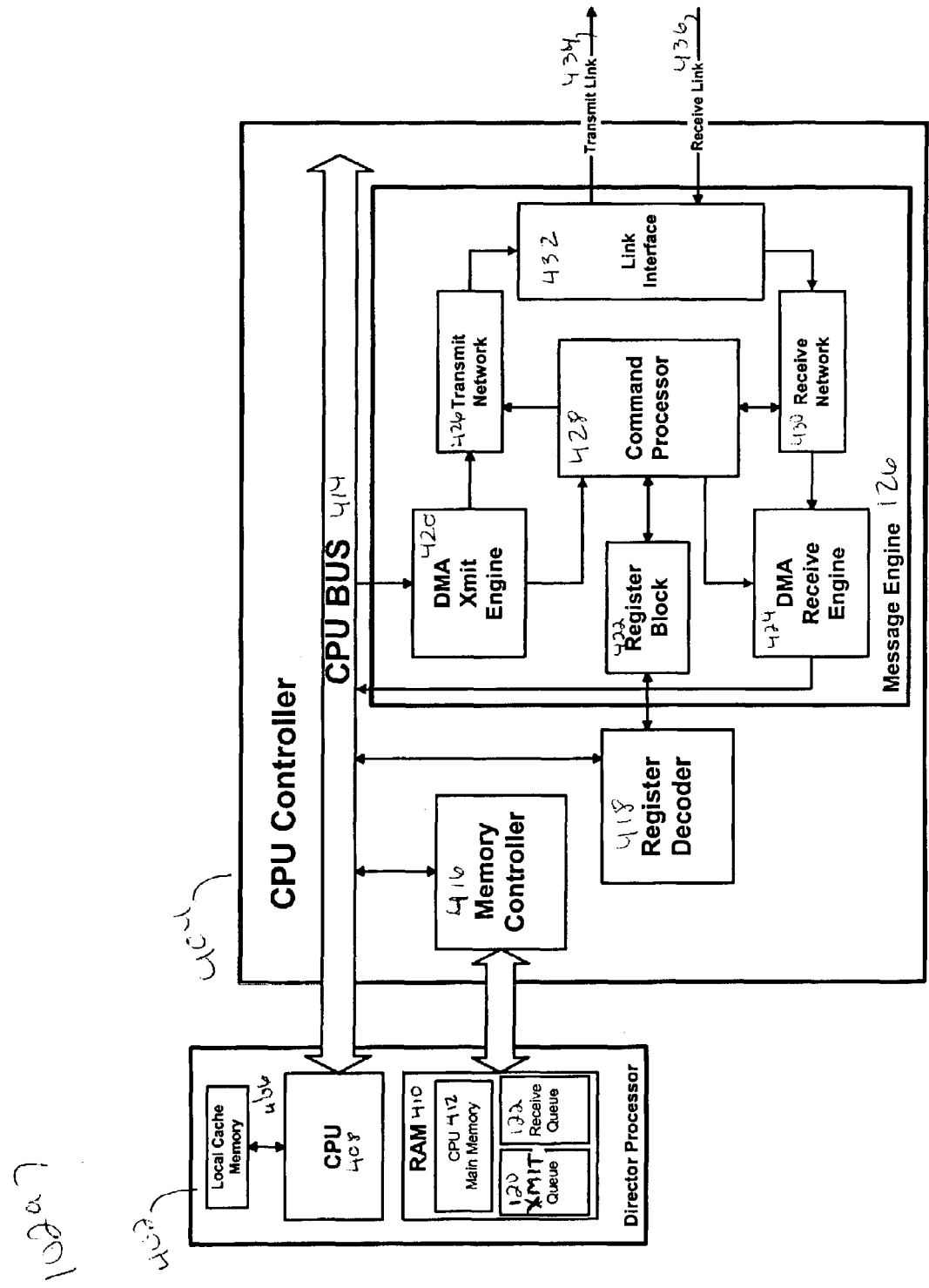
FIG. 10 is an example of an embodiment of hardware components that may be included in a director of the system of FIG. 1.

Referring now to FIG. 10, shown is an example configuration of hardware components that may be included in an embodiment of a director, such as director 102a. In this embodiment, the director 102a includes a director processor 402 coupled to a CPU controller 404. An embodiment may implement 404 into an application specific integrate circuit (ASIC). The director processor 402 includes local cache memory 406 coupled to a CPU 408. In this embodiment, the director processor 402 has an on-board RAM 410. Included in RAM 410 is CPU main memory 412 and the transmit (xmit) queues 120 and receive queues 122, as described elsewhere herein in more detail. The CPU controller 404 communicates the CPU 408 using the CPU bus 414. The CPU controller 404 includes a memory controller 416 which controls access to, and communicates with, the RAM 410. The CPU controller 404 also include a register decoder 418 and the message engine 126. The message engine 126 includes a register block 422, a DMA transmit (xmit) engine 420, a transmit network 426, a command processor 428, a DMA receive engine 424, a receive network 430 and a link interface 432. The director 102a communicates with the message switch, for example, through the link interface 432 over the transmit link 434 and the receive link 436. The use of the foregoing components in connection with transmit and receive operations will now be described.

In connection with the transmit operation, machine instructions, as produced using software, for example, may be used to build a message descriptor for a transmission which is placed in the transmit (xmit) queue 120. The message descriptor may include both the data payload and command portion. The CPU 408 sets up the DMA transmit (xmit) engine 420 to fetch the descriptor from the transmit queue 120 across to the memory controller 416, to the CPU Bus 414, into the DMA transmit engine 420. The command portion is sent to the command processor 428 and the data payload is sent to the transmit network 426. The command processor 428 schedules packets for transmission, checks the register block for partner information table on sending to destinations nodes, and also checks the XON/XOFF flow control state table status on the ability of the destination node ability to receive the transmission. The transmit network 426 forms the data packets which include the header information, data payload, and packet CRC (Cyclic Redundancy Check). The data packet is forwarded to the link interface 432. The transmit side of the link interface provides the link level credit-based flow control and forwards data packet out from the Message Engine 126 to the Switch Element, such as the message switch 104 described elsewhere herein in more detail.

In connection with a receive operation of a transmission, data packets sent from the Switch Element, such as message switch 104, arrive at the receive side of the link interface 432 and are forward to the receive network 430. Incoming link level flow control is also processed at the link interface 432. The packet CRC is checked and the data packet is partitioned into header and data payload at the receive network 430. The data payload is then sent onto the DMA receive Engine 424 and the command processor 428 sets up the DMA receive engine 424 to send the data payload to the receive queue 122 via the memory controller 416.

In connection with FIG. 10, the transmit queues 120 and the receive queues 122 may be implemented in a portion of RAM, such as RAM 410. The XOFF state information portion (row 142) of the flow control state table may also be implemented in a portion of the register block 422 which may also be RAM. The registers described above, such as the XOFF_STATE register, the XOFF_CONTROL register, the XOFF_THRESHOLD register, the XON THRESHOLD register, and the XOFF_EXPIRATION register, may be implemented in a portion of the register block 422. Other embodiments may use different hardware components and configurations than as described in connection with FIG. 10.

The foregoing techniques described herein may be implemented in an embodiment supporting the broadcast-based messaging protocol, or an equivalent. Another embodiment may also implement the foregoing techniques using a credit-based flow control, rather than a broadcast-based end-to-end flow control.

The credit-based flow control involves potential receivers issuing credits to all potential transmitters. In connection with the embodiment described herein, the message bus fabric has 64 total end-points—and each Message Engine (at each endpoint) has 64 registers corresponding to each endpoint (Partner Information Table entries) to track path availability and sequence number. These registers may be extended to include outstanding credits from a given potential receiver to each potential transmitter. In a credit-based flow control embodiment, credits for nodes in the system as maintained by each particular node are based on each particular node's buffering capabilities. Each particular node determines credit reallocation based on the difference between the total outstanding credits and the total amount of available buffering capabilities of the particular node. This difference is determined with respect to all possible or potential nodes that may be involved in message transmissions.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for controlling message flow between endpoints in a system comprising:
storing, for each endpoint, flow control state information indicating whether each endpoint is in a receiving incoming message state;
determining, by a first endpoint using a processor when a received data message is processed from a receive message queue, whether a first threshold is maintained in a buffer pool by determining whether the buffer pool has at least an amount of available buffer space as indicated by a first threshold and whether a second threshold is maintained in the receive message queue by determining whether there is at least an amount of the receive message queue available as indicated by a second threshold, wherein processing data messages of the receive message queue includes extracting portions of the data messages of the receive message queue and placing extracted portions in buffers obtained from the buffer pool; and
sending, by a first endpoint, a control message to other endpoints indicating that said first endpoint is currently not accepting data messages from said other endpoints when said first endpoint determines that at least one of said first threshold and said second threshold is not maintained, wherein, said flow control state information for said first endpoint includes a first expiration time used in connection with determining when to resume sending data messages to said first endpoint, said control message including a time value that is used by an endpoint receiving said control message to determine said first expiration time for said first endpoint, wherein an endpoint receiving said control message resumes sending data messages to said first endpoint upon an earlier occurrence of reaching said first expiration time, or receiving another control message from said first endpoint indicating said first endpoint is accepting data messages, said another control message being sent when said buffer pool of said first endpoint has at least an amount of available buffer space as indicated by a third threshold and when said first endpoint has at least an amount of said receive message queue available as indicated by a fourth threshold.

2. The method of claim 1, further comprising:
sending a data message from a sending endpoint to a receiving endpoint in accordance with state information about said receiving endpoint included in a state table of said sending endpoint.

3. The method of claim 2, wherein each endpoint maintains a control receive message queue for received control messages and wherein said receive message queue is a separate data receive message queue for received data messages.

4. The method of claim 3, wherein command messages and data messages are sent using a same communication connection.

5. The method of claim 3, wherein command messages and data messages are each sent over a different communication connection.

6. The method of claim 1, wherein said receive message queue is a hardware message queue.

7. The method of claim 1, wherein said first endpoint sends a broadcast message to the other endpoints that said first endpoint is not receiving incoming data messages if one of said first threshold and said second threshold are not maintained.

8. The method of claim 1, wherein said system is a data storage system and said endpoints are processors in said data storage system.

9. The method of claim 1, wherein each endpoint maintains a local copy of flow control state information describing flow control for each endpoint in said system.

10. The method of claim 9, wherein said flow control state information includes an indicator for each endpoint in said system as to whether said each endpoint is currently receiving data messages, said indicator having a first value when said each endpoint is not receiving data messages and a second value otherwise, an expiration time being associated with said indicator when said indicator is said first value, said expiration time representing a maximum time to a sending endpoint using said flow control state information for which said each endpoint is not receiving data messages from said sending endpoint.

11. The method of claim 10, further comprising performing, by each endpoint in said system:
determining whether a received message is one of a control message and a data message; and
if said received message is a control message, updating a copy of flow control state information in said each endpoint.

12. A non-transitory computer readable medium comprising machine executable code stored thereon that controls message flow between endpoints in a system, the computer readable medium comprising:
machine executable code that stores, for each endpoint, flow control state information indicating whether each endpoint is in a receiving incoming message state;
machine executable code that determines, by a first endpoint when a received data message is processed from a receive message queue, whether a first threshold is maintained in a buffer pool by determining whether the buffer pool has at least an amount of available buffer space as indicated by a first threshold and whether a second threshold is maintained in the receive message queue by determining whether there is at least an amount of the receive message queue available as indicated by a second threshold, wherein processing data messages of the receive message queue includes extracting portions of the data messages of the receive message queue and placing extracted portions in buffers obtained from the buffer pool; and
machine executable code that sends, by a first endpoint, control message to other endpoints indicating that said first endpoint is currently not accepting data messages from said other endpoints when said first endpoint determines that at least one of said first threshold and said second threshold is not maintained, wherein, said flow control state information for said first endpoint includes a first expiration time used in connection with determining when to resume sending data messages to said first endpoint, said control message including a time value that is used by an endpoint receiving said control message to determine said first expiration time for said first endpoint, wherein an endpoint receiving said control message resumes sending data messages to said first endpoint upon an earlier occurrence of reaching said first expiration time, or receiving another control message from said first endpoint indicating said first endpoint is accepting data messages, said another control message being sent when said buffer pool of said first endpoint has at least an amount of available buffer space as indicated by a third threshold and when said first endpoint has at least an amount of said receive message queue available as indicated by a fourth threshold.

13. The non-transitory computer readable medium of claim 12, further comprising:
machine executable code that sends a data message from a sending endpoint to a receiving endpoint in accordance with state information about said receiving endpoint included in a state table of said sending endpoint.

14. The non-transitory computer readable medium of claim 13, wherein each endpoint maintains a control receive message queue for control messages and wherein said receive message queue is a separate data receive message queue for received data messages.

15. The non-transitory computer readable medium of claim 14, wherein command messages and data messages are sent using a same communication connection.

16. The non-transitory computer readable medium of claim 14, wherein command messages and data messages are each sent over a different communication connection.

17. The non-transitory computer readable medium of claim 12, wherein said receive message queue is a hardware message queue.

18. The non-transitory computer readable medium of claim 12, wherein said first endpoint sends a broadcast message to the other endpoints that said first endpoint is not receiving incoming data messages if one of said first threshold and said second threshold are not maintained.

19. The non-transitory computer readable medium of claim 12, wherein said system is a data storage system and said endpoints are processors in said data storage system.

20. The non-transitory computer readable medium of claim 12, wherein each endpoint maintains a local copy of flow control state information describing flow control for each endpoint in said system.

21. The non-transitory computer readable medium of claim 20, wherein said flow control state information includes an indicator for each endpoint in said system as to whether said each endpoint is currently receiving data messages, said indicator having a first value when said each endpoint is not receiving data messages and a second value otherwise, an expiration time being associated with said indicator when said indicator is said first value, said expiration time representing a maximum time to a sending endpoint using said flow control state information for which said each endpoint is not receiving data messages from said sending endpoint.

22. The non-transitory computer readable medium of claim 21, further comprising machine executable code that causes each endpoint in said system to:
determine whether a received message is one of a control message and a data message; and
if said received message is a control message, update a copy of flow control state information in said each endpoint.

\* \* \* \* \*